G. W. PICKARD.
OSCILLATION RECEIVER.
APPLICATION FILED SEPT. 16, 1907.
924,827
Patented June 15, 1909
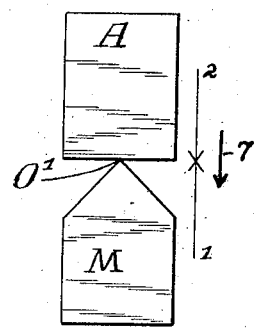
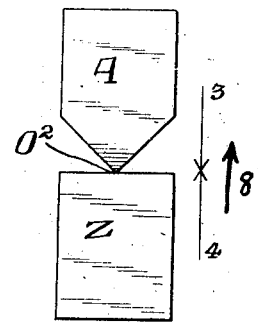
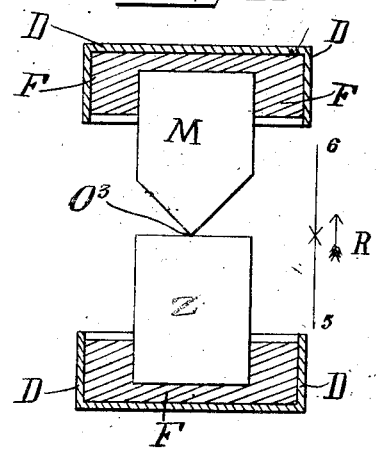
Attest:
C. J. Ashley
M. D. Kent
Inventor:
by Greenleaf Whittier Pickard
Philip Farnsworth Atty

UNITED STATES PATENT OFFICE.

GREENLEAF WHITTIER PICKARD, OF AMESBURY, MASSACHUSETTS.

OSCILLATION-RECEIVER.

No. 924,827. Specification of Letters Patent. Patented June 15, 1909.

Application filed September 16, 1907. Serial No. 393,167.

*To all whom it may concern:*

Be it known that I, GREENLEAF WHITTIER PICKARD, a citizen of the United States of America, and a resident of the town of Amesbury, State of Massachusetts, have invented certain new and useful Improvements in Oscillation-Receivers, the principles of which are set forth in the following specification and accompanying drawings, which disclose the form of the invention which I now consider to be the best of the various forms in which the principles of the invention may be embodied.

The invention involves the conjoint action, in an oscillation receiver, of a pair of certain electrical conductors, each of which possesses in a high degree the property of rectifying electrical oscillations, but in each of which this property is active in the opposite direction to that in which the activity is manifested in the other conductor, when the two conductors are operated respectively with a third conductor indifferent as to the rectifying property; the two effective conductors being combined in one device, in accordance with this invention, so that the rectifying effects of both of the conductors coöperate instead of acting in opposition, to the end of greatly increasing the useful effect of a rectifying oscillation receiver.

The invention involves also various other features to be hereinafter described and claimed.

Of the drawings, Figures 1 and 2 are diagrams of elements of the invention, and Fig. 3 is an illustration in elevation of the best embodiment of the invention.

I have found that while one rectifying conductor, coöperating in a receiver or detector with another conductor which has indifferent rectifying properties or which lacks other properties which might act in opposition, provides a useful device, nevertheless a greatly improved device may be constituted of such a special conductor when combined in a receiver or detector with another special rectifying conductor in such manner that the rectifying actions of both conductors coöperate to cause an additive or cumulative effect. This improved device is based on my observations that while certain of these rectifying conductors operating with one direction of resultant current when oscillations passed through the device, certain other such conductors operated with an opposite direction of resultant current under like conditions, in each case with respect to an indifferent non-rectifying conductor used as a standard. The improved device is based upon my further observations that in the case of such two rectifying conductors acting oppositely with respect to a standard non-rectifying conductor, they could be combined to coöperate in such way that the action of their rectifying properties would be additive or cumulative, instead of in opposition. For example, I have observed, specifically, that when an ordinary or indifferent or non-rectifying conductor such as brass is combined as one member of a detector in good small aread contact with the electrically conducting mineral manganite, an oxid of the diaspore group of hydrous oxids, an effective current results from the brass through the contact to the specified conductor, upon the passage of oscillations, owing to the rectifying power of the latter conductor, which is very high, and effective in a direction such as to oppose oscillations passing in the opposite direction. And I have observed that when the same indifferent conductor, brass, used as above as a standard of comparison, is used with the electrically conducting solid oxid of zinc, an effective current results from the oxid of zinc through the contact to the brass, upon the passage of oscillations, owing to the rectifying property of the latter conductor, which is very high and effective in a direction such as to oppose oscillations passing in the opposite direction.

Thus, considering the manganite conductor M, Fig. 1, I have observed that this possesses in a high degree the property of rectification, as shown by testing it in any suitable manner, such as the way known to physicists and consisting in connecting the conductor in circuit with a source of electromotive force, a galvanometer and a reversing switch, and noting the results, by the galvanometer deflections, of applying and reversing a member of different degrees of potential. As indicated in Fig. 1, where the other or indifferent conductor A is of brass, and where the two conductors have a suitable or extremely small area of contact O', with each other, the rectifying property acts to oppose a current in the direction of arrow 1, and to facilitate or at least not substantially oppose the passage of a current in the direction of arrow 2, so that the resulting effective current derived from the electrical oscillations is in the direction of arrow 2;

that is, into the conductor M through contact O', as clearly indicated by the prominent arrow 7. By selecting and testing other conductors, as above, another conductor may be found which rectifies with respect to brass in the opposite direction from that in which M acts with brass. Thus, I have found that Z Fig. 2, (oxid of zinc) when in suitable small-aread contact at $O^2$ with the brass conductor A, acts to a high degree to oppose oscillations passing in the direction of arrow 3 and to facilitate or at least not oppose the passage of currents in the direction of arrow 4, the resultant effective current from electrical oscillations being in the direction of arrow 4; that is, out from conductor Z through contact $O^2$, as clearly indicated by the prominent arrow 8. This is the opposite direction from that of arrow 2 of Fig. 1, which was the effective resultant of the action of the device of Fig. 1.

Either of the devices Fig. 1 or Fig. 2, constitutes an efficient detector; but I have further found that the best results, in a commercial form of apparatus, are obtained by employing two such conductors as M and Z which have a wide specific conductivity difference. Even without a wide conductivity difference the invention is extremely useful, but the employment of conductors such as those herein disclosed produces better results, owing to their conductivity difference. I have further found that the rectification action of such conductors as M is effective when used in combination with such conductors as Z, and that the current resultant of this action of M in such combination is in the same direction as in the case of Fig. 1. I have also found that the rectification action of such conductors as Z is effective when used in combination with such conductors as M, and that the current resultant of this action of Z in such combination is in the same direction as in the case of Fig. 2.

In accordance with this invention, two conductors (such as those specified above), each of which possesses in a high degree the property of rectifying oscillating currents, but in each of which the property is effective in the opposite direction from that in which the like power is effective in the other, with respect to an indifferent or non-rectifying conductor as a standard of comparison, are combined so that the rectifying action of each conductor aids and assists the corresponding action in the other conductor. This object is attained by simply placing such two conductors in good and suitably small-aread contact with each other, the pressure not being excessive, but adjusted to the particular conditions of use. Thus, as shown in Fig. 3, where the area of contact at $O^3$ (as at $O^1$ and $O^2$, Figs. 1 and 2) is suitably small, the joint effect of the action of the rectifying properties of M and Z will be additive or cumulative, such as to provide a device much more efficient than those of Figs. 1 or 2, notwithstanding that the resultants of the action of M and Z are in opposition as compared with each other, and with respect to a third or indifferent conductor, the action of one being to oppose oscillations passing from it through the contact, and the action of the other being to oppose oscillations passing through the contact to it. As we have seen in Fig. 1, the effective resultant of the action of M is a current through the brass member A in a direction from the member A through the contact $O^1$ to M; so in Fig. 3 the effective resultant of the action of M is a current in the direction of arrow 5. i. e., to M through the contact $O^3$ from the other conductor. And the currents opposed by M in Fig. 3 are in the direction of arrow 6, which are those currents which leave M through the contact with the other conductor, as in the case of Fig. 1, in the direction of arrow 1. Likewise, with respect to the independent but coöperative action of Z, the effective resultant in Fig. 2 is in the direction of arrow 4, of currents leaving Z through its contact with A, which is the direction of the arrow 5 in Fig. 3, toward the other conductor. And the currents opposed by the rectifying action of Z are in the direction of the arrow 6 of Fig. 3 and of arrow 3 of Fig. 2, which is the direction of currents passing out from Z through its junction with A and M respectively in Figs. 2 and 3. In Fig. 3, the mechanical reversal of M with respect to its position in Fig. 1, reverses the absolute direction of the passage of currents, as to the rectifying properties of that conductor, although the respective directions of current flow as to the rectifying property are constant with respect to the small-aread contact. It is now clear, therefore, that since in Fig. 3 the action of each of M and Z is such as to oppose oscillations in the direction of arrow 6, and such as to permit the passage of oscillations in the direction of arrow 5, the effective resultant will be a current, as at R (Fig. 3), in the direction of arrow 5. Thus the effects of the coöperatively-acting rectifying properties of M and Z, as in Fig. 3, will be added together in the circuit, so as to operate the usual indicating device in a much more efficient manner than by means of either of the devices of Figs. 1 or 2.

The area of physical contact between M and Z is immaterial, provided that the area of electrical contact is extremely small, and this is most easily determined by the increased efficiency which accompanies the best or the smallest-aread electrical contact. In practice a suitable small contact is produced by providing Z with a rough contact surface, as shown in Fig. 3, and produced as by fracturing the substance Z. The two members may be pressed together by any suitable means known in the art, so as to secure such good contact at the contact surfaces as will not be accompanied by a breakage of the conductors.

The device of Fig. 3 may be connected, in any of the ways known to those skilled in the art, so as to operate with wireless telegraphy or telephony circuits, or in other similar uses.

It is preferred, as shown in Fig. 3, that M and Z be each embedded in fusible metal F in a receptacle or cup D.

There may be other properties of M and Z which are involved in the electrical action of the device, either advantageously or deleteriously, and if advantageously, to a less degree than the rectifying properties of the members, or, if deleteriously, to a less degree than the resultant of the effect of said rectifying properties; but the properties specified are the ones essentially involved in this invention.

I claim:

1. An oscillation receiver, which comprises two electrical conductors which respectively possess rectifying properties, the action of one conductor being to oppose oscillations passing from it toward the other, and the action of the other conductor being to oppose oscillations passing to it from the other.

2. An oscillation receiver which comprises two massive electrical conductors which respectively possess rectifying properties, the action of one conductor being to oppose oscillations passing from it toward the other, and the action of the other conductor being to oppose oscillations passing to it from the other.

3. An oscillation receiver, which comprises two electrical conductors which respectively possess rectifying properties, and which have a small-thread contact with each other.

4. An oscillation receiver, which comprises two massive electrical conductors which respectively possess rectifying properties which are oppositely active and coöperatively effective with respect to their contact with each other, said contact being extremely small electrically.

5. An oscillation receiver, which comprises two electrical conductors which respectively possess rectifying properties which are oppositely active and coöperatively effective with respect to their contact with each other, at least one of said conductors being a conducting mineral.

6. An oscillation receiver, which comprises two electrical conductors which respectively possess rectifying properties which are oppositely active and coöperatively effective with respect to their contact with each other, at least one of said conductors being a chemical compound.

7. An oscillation receiver, which comprises two electrical conductors which respectively possess rectifying properties which are oppositely active and coöperatively effective with respect to their contact with each other, one of said conductors being of substantially lower specific conductivity than the other.

8. An oscillation receiver, which comprises two electrically conducting chemical compounds which respectively possess rectifying properties which are oppositely active and coöperatively effective with respect to their contact with each other.

9. An oscillation receiver, which comprises two conducting minerals which respectively possess rectifying properties which are oppositely active and coöperatively effective with respect to their contact with each other.

10. An oscillation receiver which comprises two electrical conductors having wide conductivity differences and possessing rectifying properties which are oppositely active, but coöperatively effective with respect to their contact with each other.

11. An oscillation receiver which comprises two electrical conductors, one of which is manganite and the other oxid of zinc.

12. An oscillation receiver which comprises two electrical conductors, one of which is an oxid and the other of which is an oxid of the hydrous oxid group.

13. A rectifier of feeble alternating or oscillatory currents, such as those produced by electric waves, which comprises an electrically conducting solid oxid possessing the property of rectification of alternating currents in general, said solid oxid having the following operative conditions for the above-specified purpose; a substantially perfect electrical contact of said solid oxid with the two circuit conductors of the oscillation circuit respectively, one at least of said conductors being of material different from said solid oxid and the contact between said solid oxid and said different conductor being sufficiently minute to permit effective action of the rectifying property of said solid oxid upon the oscillatory impulses of said feeble character; the contact of said solid oxid with the other circuit conductor of the oscillation circuit being of sufficient magnitude to prevent substantial rectification in opposition to the effective rectifying action by the minute contact.

14. A rectifier of feeble alternating or oscillatory currents, such as those produced by electric waves, which comprises an electrically conducting solid metallic oxid possessing the property of rectification of alternating currents, said solid oxid having as an operative element of the rectifier, a substantially perfect electrical contact of minute area with another conductor of different material.

15. A rectifier of feeble alternating or oscillatory currents, such as those produced by electric waves, which comprises an electrically conducting solid possessing the property of rectification of alternating currents in general, said solid having the following operative conditions for the above specified purpose; a substantially perfect electrical contact of said solid with the two circuit conductors of the oscillation circuit respectively, one at least of said circuit conductors being of material different from said solid and the contact between said solid and said different circuit conductor being sufficiently minute to permit effective action of the rectifying property of said solid upon the oscillatory impulses of said feeble character; the contact of said solid with the other circuit conductor of the oscillation circuit being of sufficient magnitude to prevent substantial rectification in opposition to the effective rectifying action by the minute contact.

16. A rectifier of feeble alternating or oscillating currents, such as those produced by electric waves, which comprises an electrically conducting member of oxid of zinc possessing the property of rectification of alternating currents, said member having as an operative element of the rectifier, a substantially perfect electrical contact of minute area with another conductor of different material.

GREENLEAF WHITTIER PICKARD.

Witnesses:
EDWARD H. ROWELL,
MYRA S. ROWELL.